United States Patent
Perraut et al.

(10) Patent No.: US 10,724,937 B2
(45) Date of Patent: Jul. 28, 2020

(54) DEVICE AND METHOD FOR BIMODAL OBSERVATION OF AN OBJECT

(71) Applicants: COMMISSARIAT A L'ENERGIE ATOMIQUE ET AUX ENERGIES ALTERNATIVES, Paris (FR); BIOMERIEUX, Marcy-l'Etoile (FR)

(72) Inventors: Francois Perraut, Saint Joseph de Riviere (FR); Quentin Josso, Lyons (FR)

(73) Assignees: COMMISSARIAT A L'ENERGIE ATOMIQUE ET AUX ENERGIES ALTERNATIVES, Paris (FR); BIOMERIEUX, Marcy-l'Etoile (FR)

( * ) Notice: Subject to any disclaimer, the term of this patent is extended or adjusted under 35 U.S.C. 154(b) by 214 days.

(21) Appl. No.: 16/066,127

(22) PCT Filed: Dec. 27, 2016

(86) PCT No.: PCT/FR2016/053674
§ 371 (c)(1),
(2) Date: Jun. 26, 2018

(87) PCT Pub. No.: WO2017/115048
PCT Pub. Date: Jul. 6, 2017

(65) Prior Publication Data
US 2020/0072728 A1  Mar. 5, 2020

(30) Foreign Application Priority Data
Dec. 28, 2015 (FR) ....................... 15 63392

(51) Int. Cl.
*G01N 15/14* (2006.01)
*G01N 21/47* (2006.01)
(Continued)

(52) U.S. Cl.
CPC ....... *G01N 15/1434* (2013.01); *G01N 15/147* (2013.01); *G01N 21/4788* (2013.01); *G03H 1/0443* (2013.01); *G03H 2001/005* (2013.01)

(58) Field of Classification Search
CPC .. G01N 15/00; G01N 15/147; G01N 15/1434; G01N 15/1436; G01N 21/00;
(Continued)

(56) References Cited

U.S. PATENT DOCUMENTS 6,219,181 B1   4/2001   Yoneyama et al.
2012/0148141 A1   6/2012   Ozcan et al.
(Continued)

FOREIGN PATENT DOCUMENTS

WO   WO 2015/004968 A1   1/2015

OTHER PUBLICATIONS

International Search Report dated Apr. 19, 2017, in PCT/FR2016/053674, filed Dec. 27, 2016.
(Continued)

*Primary Examiner* — Jonathan M Hansen
(74) *Attorney, Agent, or Firm* — Oblon, McClelland, Maier & Neustadt, L.L.P.

(57) ABSTRACT

A device including a light source, an image sensor, and a holder defining two positions between the light source and the image sensor. Each position is able to receive an object with a view to its observation. An optical system is placed between the two positions. Thus, when an object is placed in a first position, it may be observed, through the optical system, via a conventional microscopy modality. When an object is placed in the second position, it may be observed via a second lensless imagery modality.

19 Claims, 8 Drawing Sheets

(51) Int. Cl.
    *G03H 1/04*        (2006.01)
    *G03H 1/00*        (2006.01)
(58) Field of Classification Search
    CPC .................. G01N 21/031; G01N 21/45; G01N 2021/0193; G01N 2021/135
    See application file for complete search history.

(56)         References Cited

U.S. PATENT DOCUMENTS

2013/0258091 A1    10/2013  Ozacn et al.
2016/0147053 A1     5/2016  Takahashi et al.
2019/0120747 A1*    4/2019  Domenes ............. G03H 1/0443

OTHER PUBLICATIONS

Biener. G. et al., Combined reflection and transmission microscope for telemedicine applications in field settings, Lab on a Chip, vol. 11, No. 16, XP 055299022, Jun. 27, 2011, pp. 2738-2743.

* cited by examiner

DEVICE AND METHOD FOR BIMODAL OBSERVATION OF AN OBJECT

TECHNICAL FIELD

The technical field of the invention is in-line holographic imaging with a lensless imaging mode, this technique allowing an object placed facing an image sensor to be observed without magnifying optics interposed between the object and the sensor, and a lensed mode, the two modes being superposed. The object may in particular be a biological sample.

PRIOR ART

The observation of objects, for example biological samples, by lensless imaging has seen substantial development over the last ten years. This technique allows an object placed between a light source and a matrix-array image sensor to be observed without placing a magnifying optical lens between the object and the image sensor. Thus, the image sensor collects an image of a light wave transmitted by the object.

This image is formed from interference patterns generated by interference between a light wave emitted by the light source then transmitted by the sample, and diffracted waves resulting from the diffraction, by the sample, of the light wave emitted by the source. These interference patterns are sometimes called diffraction patterns.

The publication Repetto L., "Lensless digital holographic microscope with light-emitting diode illumination", Optics Letters, May 2004, describes a device including an object placed between a CCD image sensor and a light source, in fact a light-emitting diode. No magnifying optics are placed between the object and the image sensor. In the example described in this publication, the object comprises latex bead. Under the effect of the illumination with the light source, each bead produces, in the image formed by the image sensor, a diffraction pattern.

Document WO2008090330 describes a device allowing biological samples, in fact cells, to be observed by lensless imaging. The device allows an interference pattern to be associated with each cell, the morphology of the pattern allowing the type of cell to be identified. Lensless imaging would thus appear to be a simple and inexpensive alternative to a conventional microscope. In addition, it allows a field of observation that is clearly larger than that possible with a microscope to be obtained. It will thus be understood that the potential applications of this technology are many and of great interest.

Document US2012/0218379, which was published after the preceding document, recapitulates the essential of the teachings of WO2008090330, and presents a particular way of carrying out a numerical reconstruction, or holographic reconstruction. Generally, the image formed on the image sensor, i.e. the image that includes the interference patterns, may be processed via a numerical propagation algorithm, so as to estimate optical properties of the sample. Such algorithms are well known in the field of holographic reconstruction. To do this, the distance between the sample and the image sensor being known, a propagation algorithm, taking into account this distance, and the wavelength of the light wave emitted by the light source, is applied. It is then possible to reconstruct an image of an optical property of the sample. A numerical reconstruction algorithm is for example described in US 2012/0218379. Patent application US2012/0148141 describes a lensless imaging device that employs the principles detailed in US2012/0218379 in the reconstruction of spermatozoa paths.

U.S. Pat. No. 6,219,181 describes a microscope allowing a sample to be observed either using a high-magnification optical system, or a low-magnification optical system. The sample may be kept in the same position, the device being arranged to take an image of the sample using one of said optical systems. According to another possibility, the sample may be moved between two positions, each position defining one optical path, the movement being perpendicular to the optical path defined by each position. Each position is then associated with one image sensor, this requiring two image sensors to be used.

The inventors have sought to improve upon this technology, by providing a device allowing a sample to be observed, with a lensless imaging modality, and therefore without magnifying optics, but also with a conventional imaging modality.

SUMMARY OF THE INVENTION

One subject of the invention is a device for observing an object, including:
  a light source and an image sensor, said light source being able to emit a light wave, called the emission wave, along an emission axis, the light wave propagating, along an optical path, to the image sensor, through said object; and
  an optical system that is placed, on said optical path, between said light source and the image sensor;
characterized in that the device also includes:
  a holder that defines a first position and a second position, each position being able to receive said object, the holder being configured such that,
    said first position is interposed, on said optical path, between said light source and the optical system, in such a way that the latter is configured to conjugate said image sensor to said first position; and
    the second position is interposed, on said optical path, between said optical system and said image sensor, in such a way that there is no magnifying optics between said second position and the image sensor.

By conjugate said image sensor to said first position, what is meant is that the image sensor is able to conjugate said image sensor to an object placed in said first position, i.e. able to form a clear image of an object placed in said first position.

According to one embodiment, said optical path lies parallel to said emission axis in such a way that the light source, the optical system and the image sensor are aligned along said emission axis, the holder being configured in such a way that said first position and second position are aligned along said emission axis. The holder may be translationally movable in a direction that is perpendicular to the emission axis.

According to one embodiment, the device includes a first mirror that is placed, along said optical path, between the light source and the image sensor. This first mirror may in particular lie between said first and second positions and being configured to reflect a light wave propagating from said first position, to said second position. The device may then include a second mirror that is placed between the first position and the second position, the assembly formed by said first and second mirrors being configured to reflect a light wave propagating from said first position along an axis parallel to the emission axis, said first and second positions being offset along an axis that is perpendicular to said emission axis. The first and second positions may be aligned along an axis, called the offset axis, that is perpendicular to said emission axis.

The holder may include a moving mechanism that is able to move said object between said first and second positions. This moving mechanism may be able to translate said object between said first and second positions, along said offset axis.

Another subject of the invention is a method for observing an object using a device such as described above, wherein the light source emits the emission wave at a wavelength, the object being transparent or translucent at said wavelength, the method including:
  a) positioning the object in said first position, so as to obtain a first image of the object using the image sensor, the object being conjugated with the image sensor by said optical system, said first image being formed using a first modality called the conventional imaging modality;
and/or:
  b) positioning the object in said second position, so as to obtain a second image of the object using the image sensor using a second modality called the lensless imaging modality.

According to one embodiment, steps a) and b) are carried out in succession, and:
  the first image defines a first field of observation of the object; and
  the second image defines a second field of observation of the object,
said second field of observation being larger than said first field of observation. The method may then include, following step b), a step b') of numerical reconstruction, which comprises applying, to said second image, a propagation operator that takes into account a distance between said second position and the image sensor, so as to obtain an image, called the reconstructed image, of the object placed in said second position.

According to one embodiment, the method includes:
  said step a), the object positioned in the first position forming a first object; and
  a step c), in which a second object is placed in said second position; so as to simultaneously form, on the image sensor, an image, called the dual image, showing said first object and said second object. The method may then include a step d) of numerical reconstruction, which comprises applying, to said dual image, a propagation operator, so as to obtain a reconstructed dual image:
  in a plane extending through the first position, in which case the dual image thus reconstructed corresponds to an image of the first object; and/or
  in a plane extending through the second position, in which case the reconstructed dual image corresponds to an image of the second object.

The method may also include a step e) of selecting, depending on their respective intensity, representative pixels in each reconstructed image, so as to form an image of the object from the pixels thus selected. All or some of the pixels not selected are not taken into account in said image of the object. This selection may include the following substeps:
  i) calculating, for each pixel of the reconstructed image, an indicator representing a dispersion of the intensity of adjacent pixels around said pixel;
  ii) comparing the indicator calculated for each pixel to a threshold; and
  iii) selecting the representative pixels on the basis of the comparison made in substep ii).

By dispersion, what is meant is a comparison of the intensity of the pixel and of pixels neighboring said pixel with an average intensity of said pixel and of said neighboring pixels. The neighboring pixels may be chosen in a zone of interest comprising said pixel. Preferably, said zone of interest is centered on said pixel.

The selection may be carried out only among pixels for which the dispersion indicator is high.

The dispersion indicator may also correspond to the intensity of a pixel, the selected pixels being those for which the intensity exceeds a preset threshold in the reconstructed image.

The object may lie, in the first position and in the second position, such that:
  the first image defines a first field of observation of the object; and
  the second image defines a second field of observation of the object;
said second field of observation being larger than said first field of observation.

The object may be a fluidic channel, including particles placed in or on the surface of a fluid.

Another subject of the invention is a method for observing a first object and a second object, including the following steps:
  placing a light source and an image sensor in such a way that the light source emits a light wave, called the emission wave, that propagates toward the image sensor, thereby defining an optical path;
  interposing a first object and a second object between the light source and the image sensor, said first and second objects lying transversely to said optical path, in such a way that said first and second objects are placed, on said optical path, on either side of an optical system, said optical system being able to conjugate a portion of the first object with the image sensor; and
  obtaining an image, called the dual image, on the image sensor, from the emission wave that propagates, from the light source, through said first and second objects, to the image sensor.

The method may include applying a numerical propagation operator to said dual image, so as to obtain what is called a reconstructed dual image at a distance, called the reconstruction distance, from the sensor.

The method may include selecting, among said reconstructed dual images,
  a reconstructed dual image that is representative of said second object, the reconstruction distance being the distance between said second object and the image sensor;
  and/or a reconstructed dual image representative of said first object, the reconstruction distance being the distance between said first object and the image sensor.

The method may include a step of selecting representative pixels in each reconstructed image, such as described above.

The invention will be better understood from the example embodiments described below, which are described with reference to the following figures.

DESCRIPTION OF PARTICULAR EMBODIMENTS

Figure 1A:
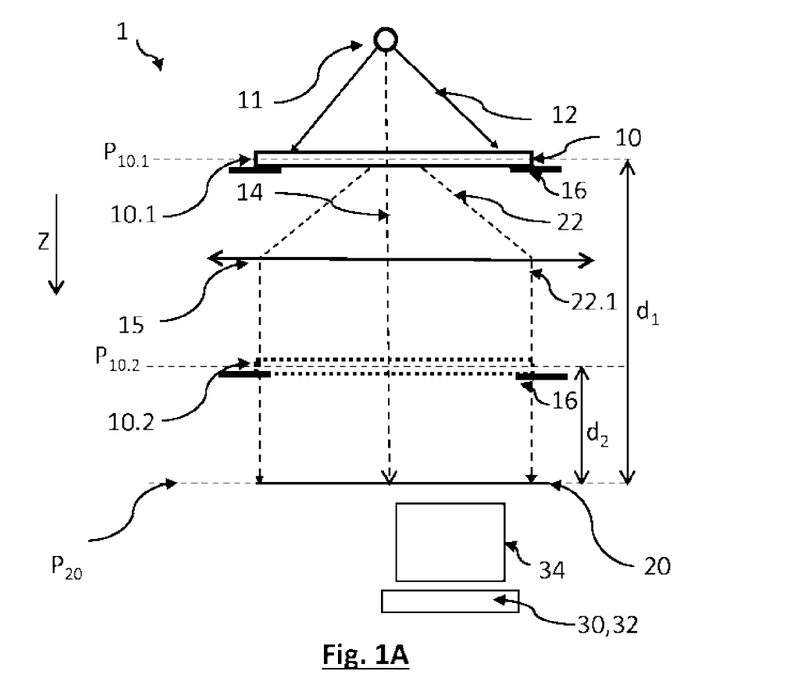
FIGS. 1A and 1B show a device according to a first embodiment of the invention.
Figure 1B:
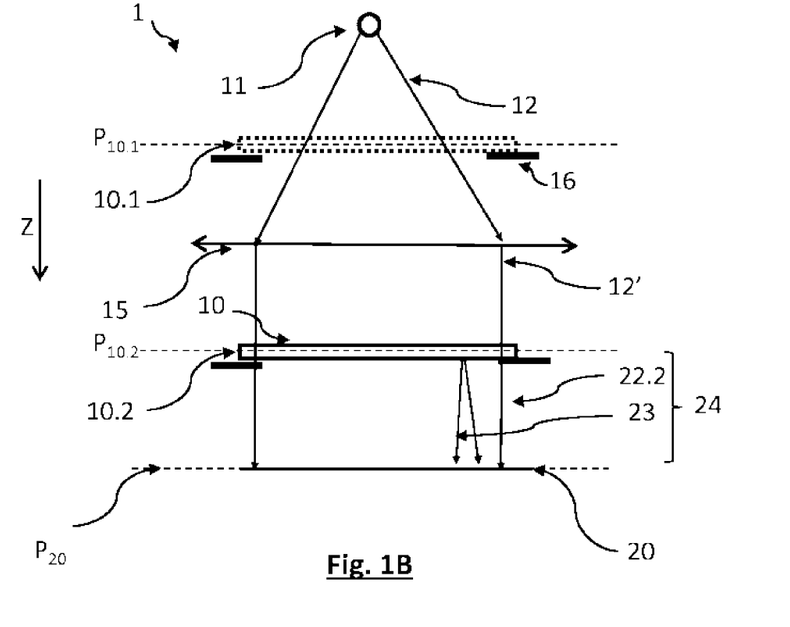

FIGS. 1A and 1B show a first embodiment of a device according to the invention. A light source 11 is able to produce a light wave 12, called the emission light wave, that propagates in the direction of an image sensor 20, along an emission axis Z. The light wave 12 is emitted at at least one wavelength λ. The wavelength may for example be a visible wavelength, i.e. comprised between 400 nm and about 700 nm. The device includes a holder 16 that is able to hold an object 10 that it is desired to observe. The holder allows the object 10 to be placed in such a way that this object is positioned in a first position 10.1, in which the object lies in a first object plane $P_{10.1}$, or in a second position 10.2, in which the object lies in a second object plane $P_{10.2}$. These two planes preferably lie parallel to each other.

Figures 1C, 1D:
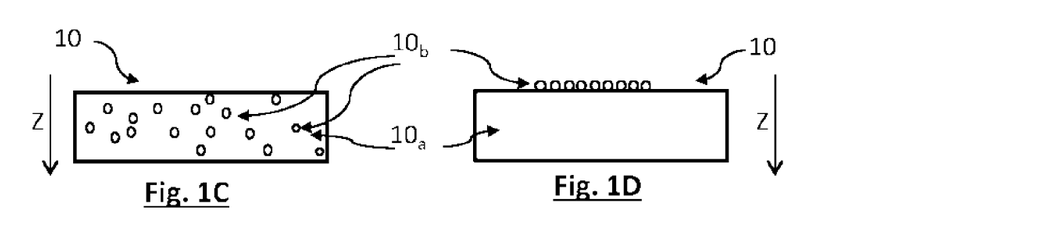
FIGS. 1C and 1D show examples of objects that are able to be observed with a device according to the invention.

The object 10 may be a sample that it is desired to characterize. It may comprise a solid or liquid medium $10_a$ that is transparent or translucent at said wavelength λ, in which medium, or on the surface of which medium, particles $10_b$ are dispersed. By translucent, what is meant is that the object transmits all or some of a light wave that is incident thereon. FIGS. 10 and 1D show examples of such objects. The particles $10_b$ may be biological particles. The medium $10_a$ may be a culture medium or a bodily liquid. By biological particle, what is meant is a cell, such as a eukaryotic cell, a bacterium or another microorganism, a fungus, a spore, a virus, etc. The term particles may also refer to microbeads, for example metal microbeads, glass microbeads or organic microbeads, which are commonly implemented in biological protocols. It may also be a question of insoluble droplets suspended in a liquid medium, for example lipid droplets in an oil-in-water type emulsion. Thus, the term particle is understood to refer to both endogenous particles, initially present in the examined object, and exogenous particles, added to this object before its observation. This term may also refer to particles resulting from the aggregation of other particles present in the sample, for example a complex formed by antibodies and elements bearing the sought-after antigen. Generally, each particle advantageously has a size smaller than 1 mm, or even smaller than 500 μm, and preferably a size comprised between 0.5 μm and 500 μm. Preferably, each particle has a size larger than the emission wavelength λ of the light source, so as to produce a diffraction effect as described below. By particle size, what is meant is the largest diameter or a diagonal.

The expression bodily liquid is understood to mean a liquid issued from an animal or human body, such as blood, urine, sweat, cerebrospinal fluid, lymph, etc. The term culture medium is understood to mean a medium propitious to the development of a biological species such as cells, bacteria or other microorganisms.

The object may also be a tissue slide, or pathology slide, including a small thickness of tissue deposited on a transparent slide. It may also be a slide resulting from the application of a staining protocol suitable for finding a microorganism in a sample, for example a Gram or Giemsa stain. By small thickness, what is meant is a thickness that is preferably smaller than 100 μm, and preferably smaller than 10 μm, and typically a few microns.

The light source may be a light-emitting diode or a laser light source, such as a laser diode. It is preferably a point source.

The device also includes an image sensor 20, which is able to form an image in a detection plane $P_{20}$. In the example shown, it is a question of a matrix-array image sensor including a matrix array of CCD or CMOS pixels. CMOS image sensors are preferred because the size of the pixels is smaller, thereby allowing images the spatial resolution of which is more favorable to be acquired. Image sensors the inter-pixel pitch of which is smaller than 3 μm are preferred, in order to improve the spatial resolution of the image. The detection plane $P_{20}$ preferably lies perpendicular to the Z-axis along which the light wave 12 is emitted.

The image sensor 20 is connected to an information-processing unit 30, for example a microprocessor, and to a screen 34. The microprocessor is connected to a memory 32, which includes instructions in particular allowing the numerical reconstruction algorithms described below to be implemented.

The image sensor 20 may comprise a mirror-type system for redirecting images toward a pixel matrix array, in which case the detection plane corresponds to the plane in which the image-redirecting system lies. Generally, the detection plane $P_{20}$ corresponds to the plane in which an image is formed. Preferably, the detection plane $P_{20}$ is parallel to the planes $P_{10.1}$ and $P_{10.2}$ described above.

The device includes an optical system 15 that is able to conjugate an object, positioned in the first position 10.1, with the image sensor 20. In other words, the optical system 15 allows a clear image of the object 10, positioned in the position 10.1, to be formed on the image sensor 20. Thus, when the object 10 is positioned in the first position 10.1, as shown in FIG. 1A, the device 1 allows a first image $I_1$ to be formed using a first conventional-microscopy-type modality, the image obtained on the image sensor 20 being focused by the optical system 15, the latter allowing a transverse magnification factor that is preferably higher than 1, and more preferably higher than 10, to be obtained. The expression transverse magnification is understood to mean a magnification in a plane perpendicular to the axis of propagation of the light, in the present case the Z-axis. In the rest of the text, the expression transverse magnification and the term magnification are used to mean the same thing. Thus, with this first modality, the first image $I_1$ obtained on the sensor 20 represents an observation of the object 10 in a first field of observation. Preferably, this field of observation is of small extent, to the benefit of a high spatial resolution, thereby allowing details of the object to be observed. FIG. 1A shows the emission light wave 12 that propagates to the object 10 placed in the position 10.1, the latter transmitting a light wave 22 that propagates to the optical system 15, this optical system then forming a light wave 22.1 that propagates to the image sensor 20, on which the first image $I_1$ is formed. In FIG. 1A, the second position 10.2 is represented by a dashed line, indicating that there is no object occupying this position.

The second position 10.2 is located facing the image sensor 20, no magnifying or image-forming optics being placed between this position and the image sensor. This does not prevent focusing micro-lenses possibly being present level with each pixel of the image sensor 20, said lenses not having an image-magnifying function. Thus, when the object 10 is placed in this second position 10.2, as shown in FIG. 1B, the image sensor 20 is able to form a second image $I_2$ of the object using a second modality, called the lensless-imaging modality. With this second modality, the light wave 12 emitted by the light source 11 passes through the optical system 15, the latter forming a light wave 12', called the incident wave, that propagates to the object, preferably in plane-wave form. Some of the wave 12' is then transmitted by the object, forming a transmitted wave 22.2, and propagates to the image sensor 20. Moreover, under the effect of the exposure to the incident wave 12', the object may generate a diffracted wave 23 resulting from the diffraction, by the object, of the incident wave 12'. The image sensor 20 is therefore exposed to a wave, called the exposure wave 24, that comprises the transmitted wave 22.2 and the diffracted wave 23. Detection of the exposure wave 24 by the image sensor allows a second image $I_2$, defining a second field of observation on the object, to be formed. This second image $I_2$ represents a spatial distribution of the amplitude of the exposure wave 24 in the detection plane $P_{20}$. It may in particular include diffraction patterns resulting from the interference between the transmitted wave 22.2 and the diffracted wave 23. These patterns may take the form of a central core encircled which concentric rings. It is a question of diffraction patterns such as described in the section relating to the prior art. When the object includes various particles $10_b$, the diffracted wave 23 includes a plurality of elementary diffracted waves, each elementary diffracted wave resulting from the diffraction of the incident wave 12' by said particles. The appearance of these diffracted waves is favored when the size of said particles is of the order of or larger than the wavelength λ emitted by the light source 11. In FIG. 1B, the first position 10.1 is represented by a dashed line, indicating that there is no object occupying this position.

Thus, the holder 16 allows an object to be held in the first position 10.1 (FIG. 1A), between the light source 11 and the optical system 15, or in the second position 10.2 (FIG. 1B), between said optical system 15 and the image sensor 20. The optical system 15 is placed between the first position 10.1 and the second position 10.2. In this example, the light source 11, the first position 10.1, the optical system 15, the second position 10.2 and the image sensor 20 are aligned, in this order, along the emission axis Z. Because of this alignment, the emission axis Z also corresponds to an axis of propagation of the light between the light source 11 and the image sensor 20. The light wave emitted by the light source 11 thus follows a linear optical path 14 to the image sensor 20, through the first position 10.1, the optical system 15 and the second position 10.2. In the examples shown in FIGS. 1A and 1B, this optical path 14 lies parallel to the Z-axis along which the light wave 12 is emitted. In other embodiments, discussed in the description below, this optical path need not be linear. Generally, the first position 10.1 and the second position 10.2 lie, along said optical path 14, at a first distance $d_1$ and at a second distance $d_2$ from the image sensor 20, respectively, $d_1$ being larger than $d_2$.

In the second imaging modality, because magnifying optics are absent between the image sensor 20 and the second position, the second image $I_2$ obtained on the image sensor 20 represents an observation of the object 10 in a second field of observation that is preferably larger than the first field of observation.

The second image $I_2$ obtained on the image sensor 20 may be exploited as such. Specifically, it is known that certain particles produce diffraction patterns the morphology of which is specific thereto. It is thus possible to count these particles, or even to identify them. This is for example described in document WO2008090330, which was cited with reference to the prior art. Thus, a user may make an observation of the object using this second modality, so as to obtain an observation with a large field of observation. He may then target certain zones of interest of the object, and obtain a more detailed image thereof, with a narrower field of observation, by placing the object in the first position 10.1. The device thus allows observation of a detail of the object with a narrow field of observation, through the optical system 15, by virtue of the first modality, to be alternated with an observation of the object, with a large field of observation, by virtue of the second modality.

According to one variant, a reconstruction algorithm may be applied to the image $I_2$ obtained using the second modality, so as to obtain a reconstructed image in a plane parallel to the detection plane $P_{20}$, called the reconstruction plane $P_z$, placed at a known distance $d_r$, called the reconstruction distance, from the detection plane $P_{20}$, along the propagation axis Z. It is then a question of applying the principles of numerical holographic reconstruction, which are for example described in the publication Ryle et al. "Digital in-line holography of biological specimens", Proc. of SPIE Vol. 6311 (2006), i.e. of obtaining the product of convolution of the second image $I_2$ with a propagation operator $h(x,y,z)$. The function of the propagation operator $h(x,y,z)$ is to describe the propagation of the light between the image sensor 20 and a point of coordinates $(x,y,z)$. The coordinates $(x,y)$ are the coordinates of pixels in the detection plane $P_{20}$, whereas the coordinate z is a coordinate along the propagation axis Z. The product of convolution of the image with the propagation operator allows a complex expression $I_{2,z}(x,y)$ to be reconstructed for the exposure wave 24 at any point of spatial coordinates $(x,y,z)$, and in particular in a plane located at a reconstruction distance $d_r$ from the image sensor, having the equation $z=d_r$. A reconstructed image $I_{2,z=d_r}$ is then obtained. It is then possible to determine the amplitude u(x,y,z) and the phase φ(x,y,z) of the exposure wave 24 at the reconstruction distance $d_r$, where:

$$u(x,y,z=d_r)=abs[I_{2,z=d_r}(x,y)]; \text{ and}$$

$$\varphi(x,y,z=d_r)=arg[I_{2,z=d_r}(x,y)].$$

The operators abs and arg are the modulus and argument, respectively.

In this example, the detection plane $P_{20}$ is assigned a coordinate z=0. The propagation operator may be such that:

$$h(x, y, z) = \frac{z}{2\pi r}\left(1 - j2\pi\frac{r}{\lambda}\right)\frac{e^{\left(j2\pi\frac{r}{\lambda}\right)}}{r^2},$$

where $r=\sqrt{x^2+y^2+z^2}$, and λ is the wavelength.

Such an operator was described in the publication Marathay, A "On the usual approximation used in the Rayleigh-Sommerfeld diffraction theory", J. Opt. Soc. Am. A, Vol. 21, No. 4, April 2004.

Other propagation operators are usable, for example an operator based on the Fresnel-Helmholtz function, such that:

$$h(x, y, z) = \frac{1}{j\lambda z}e^{j2\pi\frac{z}{\lambda}}\exp\left(j\pi\frac{(x+y)^2}{\lambda z}\right).$$

When the reconstruction is carried out in the direction of propagation of the light, for example from an object plane $P_{10-1}$ or $P_{10-2}$ to the detection plane $P_{20}$, propagation is spoken of. When the reconstruction is carried out in the inverse direction to the propagation of the light, for example from the detection plane $P_{20}$ to a plane located between the light source said detection plane, and an object plane $P_{10-1}$ or $P_{10-2}$ for example, back propagation is spoken of. In the rest of the text, the axis of propagation of the light is considered to be oriented from the light source 11 to the image sensor 20, and the coordinate z=0 is considered to correspond to the detection plane $P_{20}$ in which the image sensor 20 lies.

As already described, the device shown in FIG. 1 allows a given object 10 to be alternatively placed in the first position 10.1 and in the second position 10.2, thereby allowing a bimodal observation of this object.

Figure 2A:
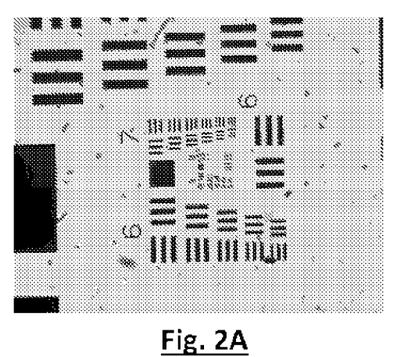
FIG. 2A shows an image of an object, in fact a resolution test pattern, obtained using a device according to the invention, the test pattern being positioned in a first position of said device.
Figure 2B:
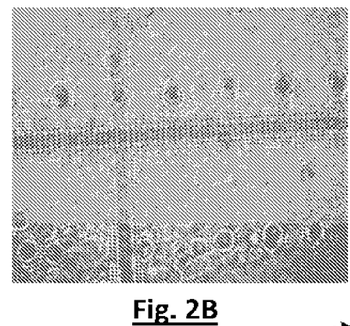
FIG. 2B shows an image of an object, in fact a graduated test pattern, obtained using a device according to the invention, the test pattern being in a second position of said device.
Figure 2C:
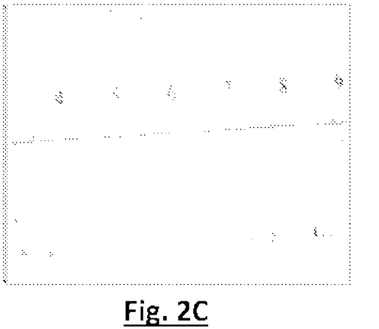
FIG. 2C shows an image obtained by applying a numerical reconstruction algorithm to the image shown in FIG. 2B.
Figure 2D:
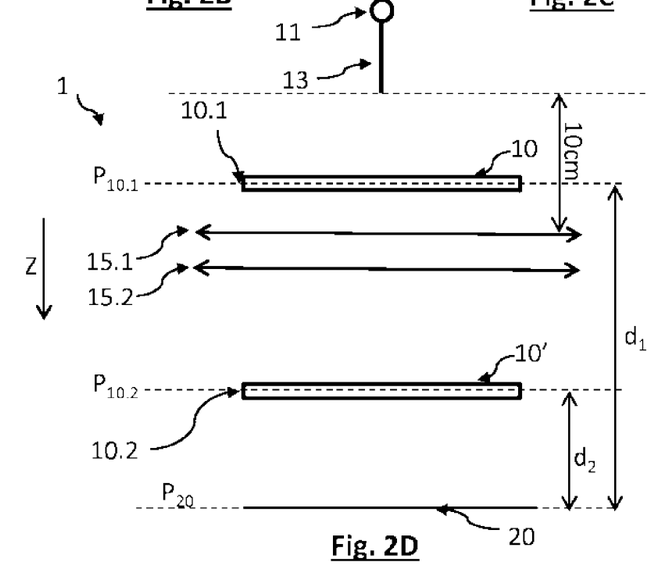
FIG. 2D shows an experimental device used to carry out trials that are described with reference to FIGS. 2A to 2C, and 4A to 4C and 5A to 5C.

FIGS. 2A, 2B and 2C correspond to images produced with an experimental device such as shown in FIG. 2D. In this device, the light source 11 is a light-emitting diode, sold by Innovation Optics under the reference Lumibright 1700A-100-A-C0, the spectral emission band of which is centered on the wavelength λ=450 nm. This light-emitting diode is placed facing a first end of an optical fiber 13, the second end of which is placed facing the object. The diameter of the core of the optical fiber is 1 mm. According to one variant, the optical fiber 13 may be replaced by a diaphragm, the aperture of which is typically comprised between 5 μm and 1 mm and preferably between 50 μm and 500 μm, and which is for example 150 μm. The optical fiber or diaphragm form a spatial filter 13 allowing a point light source to be formed when the light source 11 is not judged to be sufficiently point-like.

The image sensor 20 is a CMOS sensor sold by Aptina under the reference Micron MT9P031. It is a monochromatic CMOS sensor comprising 2592×1944 pixels of 2.2 μm side length, forming a detection surface the area of which is 24.4 mm².

The optical system 15 comprises an objective 15.1, of Motic brand, of reference EF-N plan 40X, of 0.65 numerical aperture, and of focal length $f_1$=4.6 mm. This objective is placed at a distance equal to 10 cm from the distal end of the optical fiber 13. It is placed at a distance of about 300 μm from the first position 10.1 of the device, and is placed in contact with a tube lens 15.2 (reference AC 254-050-A, manufacturer Thorlabs) of 25 mm diameter and of 50 mm focal length. The image sensor is placed at a distance of 43.7 mm from the tube lens 15.2. The first position and the second position lie at a distance $d_1$=26.2 mm and $d_2$=15.3 mm from the image sensor 20, respectively. This optical system allows a first image $I_1$ of an object 10 placed in the first position 10.1 to be formed on the image sensor, said image being assigned a magnification factor equal to the ratio of the focal lengths, i.e. of about 10.8.

FIG. 2A shows a first image $I_1$ of a USAF 1951 resolution test pattern placed in the first position 10.1, the second position 10.2 being left free. FIG. 2B shows a second image $I_2$ of a transparent test pattern comprising opaque graduations, said test pattern being placed in the second position 10.2, the first position 10.1 being left free. The second image $I_2$ has been subjected to a numerical reconstruction, aiming to convolute this image with a propagation operator h(x,y,z) as described above, z being equal to $-d_2$, i.e. corresponding to the second object plane $P_{10.2}$. An image that is said to be reconstructed, at the position $d_2$, is obtained, this image being noted $I_{2,z=d2}$ and being representative of the object placed in the second position, i.e. of the graduated test pattern, this reconstructed image being shown in FIG. 2C. In this example, the propagation operator h(x,y,z) implemented is:

$$h(x, y, z) = \frac{z}{2\pi r}\left(1 - j2\pi\frac{r}{\lambda}\right)\frac{e^{\left(j2\pi\frac{r}{\lambda}\right)}}{r^2},$$

where $r=\sqrt{x^2+y^2+z^2}$.

The reconstructed image $I_{2,z=d2}$ corresponds well to the graduated test pattern. It will be noted that the second position 10.2 allows an image to be obtained the field of observation of which is about 6.1 mm×4.6 mm, to be compared with the field of observation obtained when the object is placed in the first position 10.1, this field of observation being 528 μm×396 μm in extent.

In the preceding trial, in succession, a first object, in fact the USAF 1951 test pattern, was placed in the first position 10.1, then a second object, in fact the graduated test pattern, was placed in the second position 10.2.

Figure 1E:
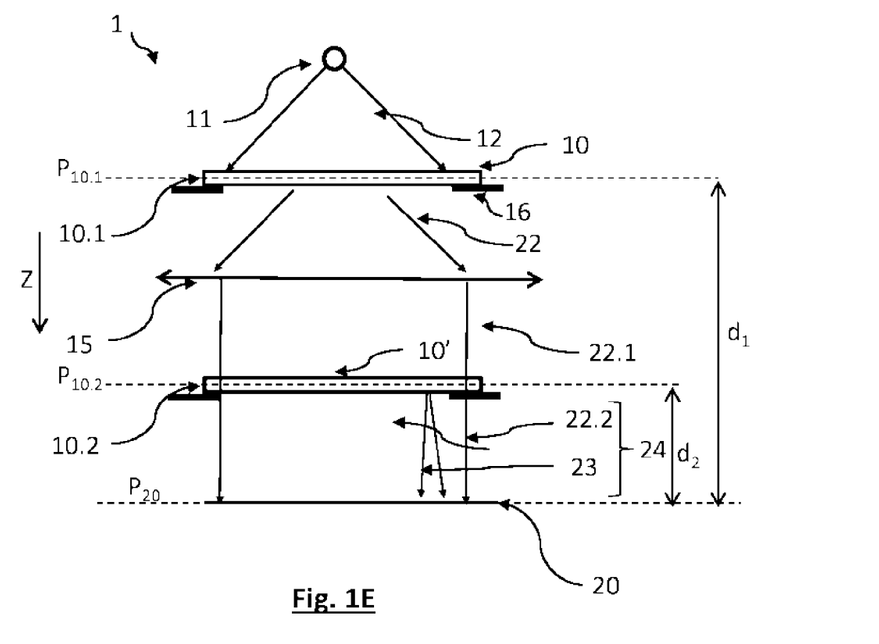
FIG. 1E shows one particular implementation of the device shown in FIGS. 1A and 1B.

Alternatively, as shown in FIG. 1E, the experimental device schematically shown in FIG. 2D makes it possible to simultaneously place an object, called the first object 10, in the first position 10.1, and another object, called the auxiliary object 10' or second object, in the second position 10.2. The first object 10, placed in the first position 10.1, transmits a wave 22 under the effect of the illumination thereof by the wave 12 emitted by the light source 11. The wave 22 transmitted by the object passes through the optical system 15, to form a wave 22.1, the latter propagating to the second object 10' placed in the second position 10.2, and then forms a wave incident on the second object 10'. Some 22.2 of this wave is transmitted by the second object 10' and propagates to the image sensor 20. Moreover, under the effect of its illumination by the incident wave 22.1, the second object 10' produces a diffracted wave 23, which propagates to the image sensor 20. Thus, the image sensor 20 is exposed to a wave 24, called the sensor exposure wave, said wave being formed by:
- the wave 22.2 transmitted by the second object 10', placed in the second position, and partially representative of the first object 10, placed in the first position; and
- the diffracted wave 23 formed by the second object 10', which wave interferes with the wave 22.2 transmitted by this object.

The image sensor 20 then forms what is called a dual image $I_3$ representing a spatial distribution of the intensity of the exposure wave 24 in the detection plane $P_{20}$. This dual image $I_3$ is representative of the first object 10 and of the second object 10'. It is then necessary to distinguish, in said dual image $I_3$, a contribution $I_{3-1}$, corresponding to an image of the object 10 and a contribution $I_{3-2}$, corresponding to an image of the second object 10'.

Figure 3:
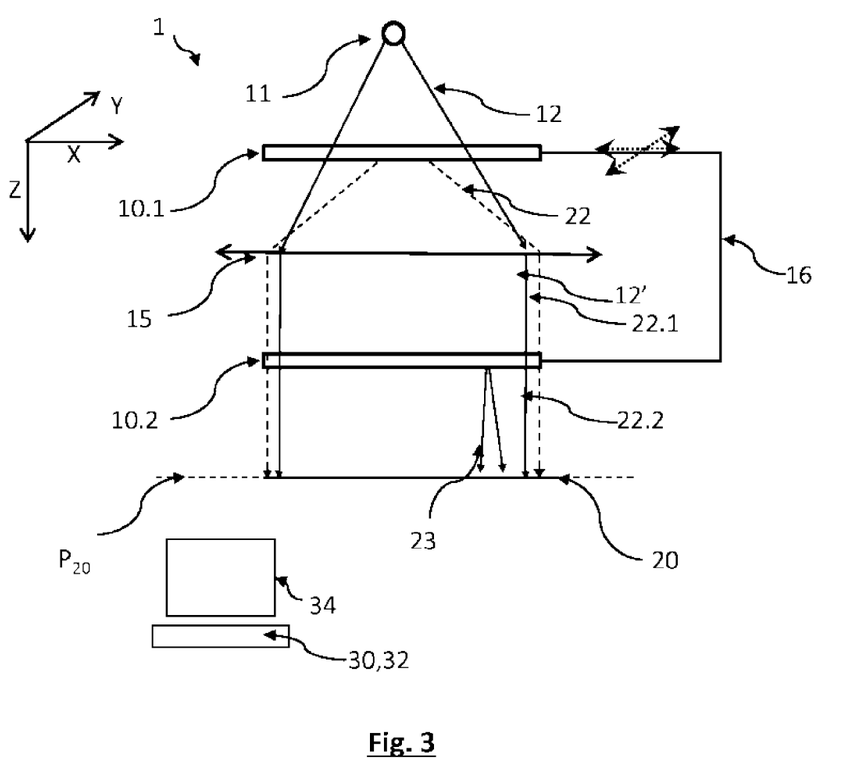
FIG. 3 shows a variant of the device shown in FIGS. 1A, 1B and 1E.

According to one embodiment, shown in FIG. 3, the holder 16 allows a simultaneous translation of the first object 10 placed in the first position 10.1 and of the second object 10' placed in the second position 10.2, this translation being carried out in an XY plane perpendicular to the Z-axis of propagation of the light. The contribution $I_{3-1}$ of the first object 10 then moves more than the contribution $I_{3-2}$ of the second object 10' and in an inverse direction. This difference in movement allows the two contributions to be distinguished from each other. This discrimination may then be carried out visually, via the screen 34. It may also be carried out by the information-processing unit 30, provided that a suitable image-processing algorithm able to be stored in the memory 32 is implemented.

The same effect may be obtained, using the device shown in FIG. 1E, by modifying the inclination of the emission axis Z of the light between two images successively formed on the image sensor. The contribution $I_{3-1}$ of the first object 10 then moves more than the contribution $I_{3-2}$ of the second object 10' and in an inverse direction. This difference in movement allows the two contributions to be distinguished from each other.

According to another embodiment, the dual image $I_3$ is subjected to a numerical reconstruction algorithm allowing the respective contributions of the first object 10 and of the second object 10' to be distinguished as a function of their distances $d_1$, $d_2$ with respect to the image sensor 20, along the optical path 14.

Thus, after a dual image $I_3$ has been obtained, the latter is subjected to a convolution with a propagation operator $h(x,y,z)$, the z coordinate corresponding either to the distance $d_1$ ($z=\pm d_1$) or to the distance $d_2$ ($z=\pm d_2$). The indication $z=\pm d_1$ corresponds to the fact that the propagation may take place in the direction of the propagation axis Z, or in an opposite direction, the latter case corresponding to a back propagation. In the following examples, back propagations ($z<0$) are performed, though it will be understood that a propagation with positive values of z could also be envisioned. The coordinate $z=0$ corresponds to the detection plane $P_{20}$. The back propagations of the dual image $I_3$ by the first distance $d_1$ and the second distance $d_2$, respectively, are referred to using the notations $I_{3,z=-d1}$ and $I_{3,z=-d2}$. They respectively correspond, discounting reconstruction noise, to an image $I_1$ that is representative of the first object 10 placed in the position 10.1, and to an image $I_2$ that is representative of the object 10', placed in the position 10.2, with:

$$I_1 \approx I_{3,z=-d1} = I_3 * h_{z=-d_1}$$

$$I_2 \approx I_{3,z=-d2} = I_3 * h_{z=-d_2}.$$

The propagation operator used is that described in the preceding example. The notation $h_{z=-d_1}$ designates the operator h corresponding to a propagation distance $z=-d_1$. The device shown in FIG. 2D was implemented by placing:
- in the first position 10.1, a test pattern, called the phase test pattern, including circular holes, etched in a glass slide, each hole having a micron-sized diameter (7 µm), defining a regular lattice of square lattice cells, each hole being placed in one corner of a square of 105 µm side length. This phase test pattern corresponds to the first object 10; and
- in the second position 10.2, the graduated test pattern described in the preceding example and presented in FIG. 2C. This graduated test pattern corresponds to the second object 10'.

As in the preceding example, the first and second positions are placed at a distance $d_1=26.2$ mm and $d_2=15.3$ mm from the image sensor, respectively.

Figure 4A:
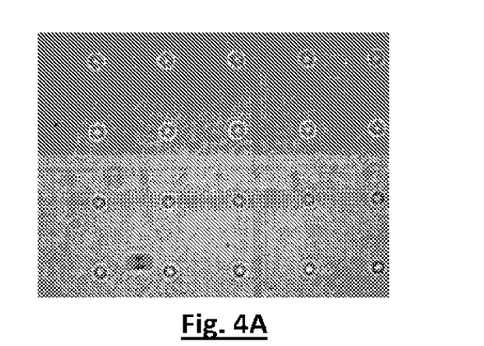
FIG. 4A shows what is called a dual image, obtained by implementing a device such as shown in FIG. 1E or 2D, allowing simultaneous observation of a test pattern, called the phase test pattern, and of a graduated test pattern.
Figure 4B:
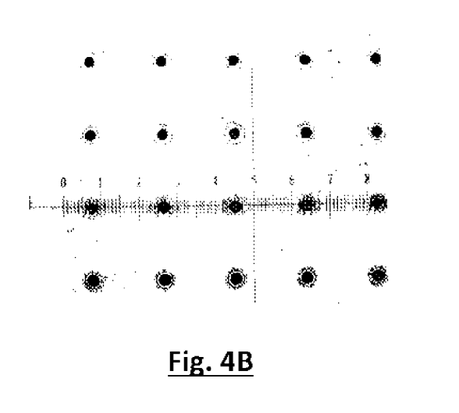
FIG. 4B is an image of the phase test pattern, obtained by applying a numerical reconstruction to the dual image shown in FIG. 4A.
Figure 4C:
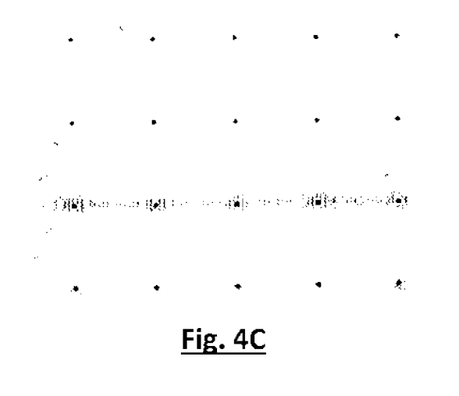
FIG. 4C shows an image of the graduated test pattern, obtained by applying a numerical reconstruction to the dual image shown in FIG. 4A.

FIG. 4A shows a dual image $I_3$ obtained on the detector. As indicated above, this dual image comprises a first contribution $I_{3-1}$ due to the first object 10 placed at the first position 10.1 (in the present case the phase test pattern), and a second contribution $I_{3-2}$ due to the second object 10' placed at the second position 10.2, in the present case the graduated test pattern. This dual image may be subjected to a reconstruction at the distance $d_1$, and to a reconstruction at the distance $d_2$, via a convolution with the propagation operator described above. This allows a first image $I_1$ of the first object and a second image $I_2$ of the second object to be established. FIGS. 4B and 4C show the images $I_1$ and $I_2$, respectively. This demonstrates that it is possible to obtain, from the dual image formed on the detector, exploitable images of objects placed simultaneously in the two positions 10.1 and 10.2 of the device, these objects being observed using different imaging modalities.

However, the quality of the images of each object may be improved by implementing another reconstruction method, applied to the dual image $I_3$. The dual image is subjected to a plurality of reconstructions, in a distance range $d_r$ comprising both the first distance $d_1$ and the second distance $d_2$. Thus, $d_1 \leq d_r \leq d_2$. A stack of images $I_z$ reconstructed in various reconstruction planes $P_z$ parallel to the detection plane $P_{20}$ is obtained, each reconstructed image $I_z$ being such that: $I_{z=-dr}=I_3 * h_{z=-dr}$ with $z_{min} \leq -d_1$ and $z_{max} \geq -d_2$, $z_{min}$ and $z_{max}$ being the limits of the range in which the reconstruction is carried out.

For all or some of the pixels $I_z(x,y)$ of each image $I_z$ reconstructed at the reconstruction distance z, a coefficient, called the Tamura coefficient, $C_z(x,y)$, is determined, this coefficient being such that:

$$C_z(x,y) = \left[\frac{\left(\frac{1}{n^2-1}\sum_{i=x-\frac{n-1}{2}}^{i=x+\frac{n-1}{2}}\sum_{j=y-\frac{n-1}{2}}^{j=y+\frac{n-1}{2}}(I_z(i,j)-\bar{I}_z(x,y))^2\right)^{\frac{1}{2}}}{\bar{I}_z(x,y)}\right]^{\frac{1}{2}}$$

where:
- n is an uneven integer, the Tamura coefficient relative to a pixel (x,y) being determined depending on a group of n pixels (i,j) of the image $I_z$, said pixels being located in a region of interest centered on the pixel (x,y) and extending n pixels along the X-axis and n pixels along the Y-axis, the axes X and Y being perpendicular to the propagation axis Z, such that the reconstructed image 4 lies in a plane parallel to the axes X and Y; n is for example equal to 7 and is usually comprised between 3 and 15; and $\bar{I}_z(x,y)$ is an average of the image $I_z$ in said zone of interest centered on the pixel (x, y), such that $$\bar{I}_z(x, y) = \frac{1}{n^2} \sum_{i=x-\frac{n-1}{2}}^{i=x+\frac{n-1}{2}} \sum_{j=y-\frac{n-1}{2}}^{j=y+\frac{n-1}{2}} I_z(i, j).$$

To determine a Tamura coefficient on the border of an image, the reconstructed image $I_z$ is extended, beyond each of these borders, with virtual pixels the value of which is set to the average value of the pixels of this image.

In each reconstructed image $I_z$, each pixel (x,y) the Tamura coefficient $C_z(x,y)$ of which exceeds a threshold value $s_z$ is considered to be significant and is assigned a preset intensity value $i_z$, depending on the coordinate z of the plane $P_z$ in which the reconstructed image $I_z$ lies. Each pixel (x,y) associated with a Tamura coefficient $C_z(x,y)$ lower than the threshold value $s_z$ is given a zero intensity value. In other words, each reconstructed image $I_z$ is binarized to form a binarized reconstructed image denoted $\hat{I}_z$: the significant pixels are assigned the intensity value $i_z$, depending on the reconstruction distance z, whereas the other pixels are assigned an intensity of zero. The threshold value $s_z$ considered for each reconstructed image $I_z$ may be preset, or set depending on the distribution of the Tamura coefficients $C_z(x,y)$ in the image $I_z$: it may for example be a question of the mean or median or of another fractal.

Figure 5A:
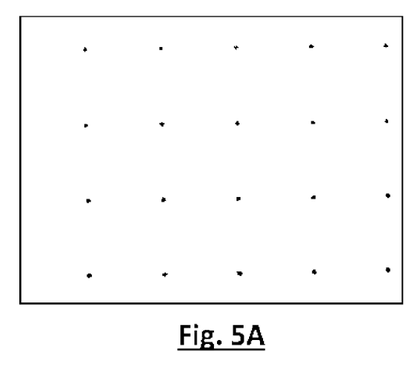
FIG. 5A shows an image of the phase test pattern, obtained by applying a numerical reconstruction to the dual image shown in FIG. 4A, coupled with a pixel-selecting step.
Figure 5B:
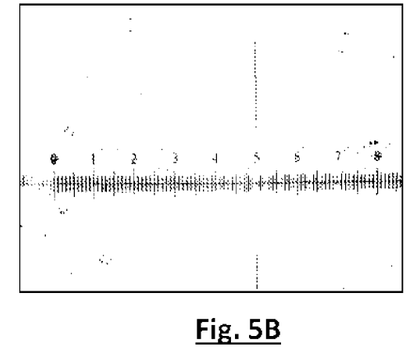
FIG. 5B is an image of the graduated test pattern, obtained by applying a numerical reconstruction to the dual image shown in FIG. 4A, coupled with a pixel-selecting step.

Reconstructed binarized images $\hat{I}_z$ the reconstruction distances of which correspond to the first position 10.1 (i.e. $z=-d_1$) and to the second position 10.2 (i.e. $z=-d_2$), respectively, may then be formed. The images shown in FIGS. 5A and 5B, respectively, are then obtained. FIG. 5A shows the binarized image $\hat{I}_z$ with $z=-d_1$, corresponding to a first image $I_1$ of the first object 10. FIG. 5B shows the binarized image $\hat{I}_z$ with $z=-d_2$, corresponding to a second image $I_2$ of the second object 10'.

Figure 5C:
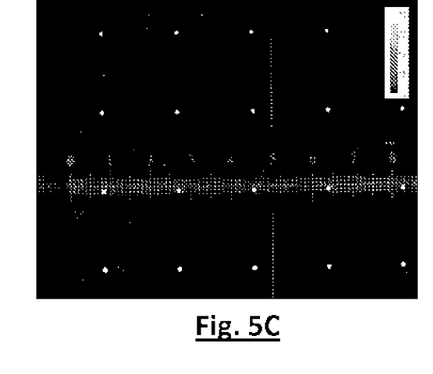
FIG. 5C shows a fusion of the images 5A and 5B into one and the same image.

It is also possible to form an overall image containing all of the values of the significant pixels $\hat{I}I_z(x,y)$ of the stack of binarized reconstructed images, with z comprised between $z_{min}$ and $z_{max}$. Since the intensity $i_z$ of each significant pixel depends on the reconstruction distance z, it is possible to obtain, in a single image, a representation of the two observed objects. FIG. 5C shows one such example, the intensity $i_z$ of each significant pixel being proportional to the absolute value of the coordinate z: the further an element of an object is from the detection plane, the lighter it appears in the overall image. The phase test pattern, located in the first position ($z=-d_1$) is observed simultaneously with the graduated test pattern located in the second position ($z=-d_2$). In this overall image, the two objects 10 and 10' appear simultaneously, and are shown with different intensity levels. The gray-level scale of FIG. 5C allows the correspondence between the reconstruction distance and the intensity level of a pixel to be seen. The pixels corresponding to the graduated test pattern are shown in gray, this corresponding to the distance $d_2$ of 15 mm, whereas the pixels corresponding to the phase test pattern are shown in white, this corresponding to the distance $d_1$ of 26 mm.

Thus, according to this embodiment, on the basis of a dual image $I_3$, it is possible:

to apply a numerical propagation algorithm, so as to obtain a reconstructed image $I_{3,z=-d1}$, $I_{3,z=-d2}$ in reconstruction planes corresponding to each position 10.1 and 10.2, respectively;

to select, in each reconstructed image, what are called significant pixels, the selection being carried out using the intensity of said pixels in the reconstructed image; and to form each reconstructed image using only the pixels thus selected.

The selection may be made on the basis of an indicator, associated with each pixel $I_{3,z=-d1}(x,y)$, $I_{3,z=-d2}(x,y)$, this indicator representing a dispersion of the intensity of the pixels in a zone of interest centered on said pixel. This indicator may be normalized by an average value of the intensity of the image $I_z$ in said zone of interest. This indicator may be a Tamura criterion $C_z(x,y)$, such as explained above. It will be noted that recourse to such an indicator, applied to holographic reconstruction, has been described in the publication Pitkäako Tomi, "Partially coherent digital in-line holographic microscopy in characterization of a microscopic target", Applied Optics, Vol. 53, No. 15, 20 May 2014.

The selection may also be made on the basis of a thresholding of the intensity of each pixel of the reconstructed image $I_z$, with respect to a preset intensity threshold $s_z$.

This embodiment may also include a step in which each representative pixel is assigned an intensity value $I_z$ that is dependent on the reconstruction distance z. In this case, an overall image including all of the representative pixels of all of the reconstructed images may be formed, in which image the intensity of the pixels indicates the distance between the object represented by said pixel and the image sensor.

The obtainment of a dual image and the formation of two images that are representative of the first object and of the second object, respectively, is not tied to the device shown in FIG. 2D. It may be applied to the device shown in FIGS. 6A to 6C described below, or to the devices shown in FIGS. 1A, 1B and 1E.

Figure 6A:
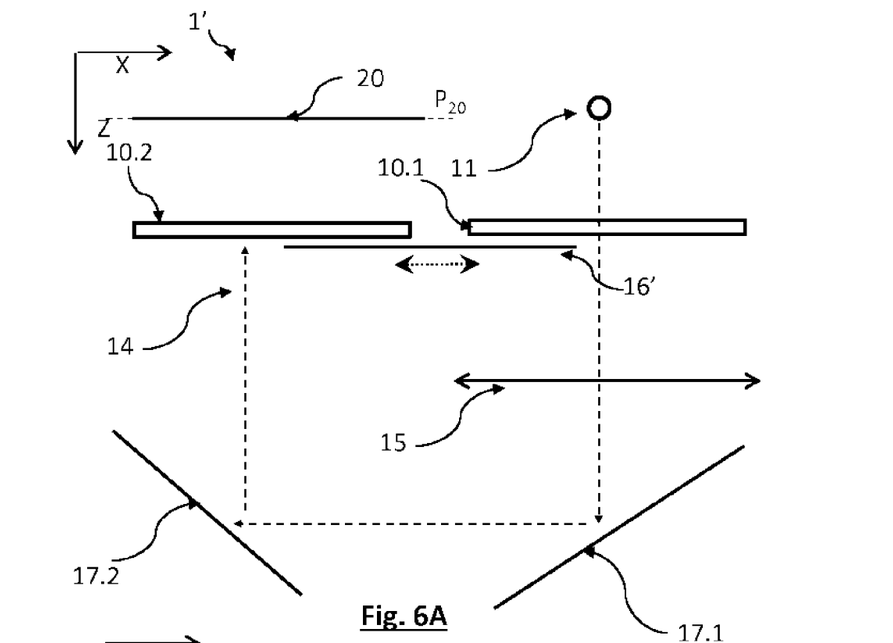
FIGS. 6A and 6B show a second embodiment of a device according to the invention.

FIG. 6A shows another embodiment, in which a device 1' includes two mirrors 17.1 and 17.2, each mirror being able to reflect a light wave, that is incident thereon at an angle of 90°. These mirrors are placed so as to form an assembly that reflects the light wave, that is incident thereon, 12 emitted by the light source 11 along an axis parallel to the emission axis Z. Thus, the light wave follows a linear optical path to the first mirror 17.1, where it is deviated orthogonally in one rotation direction, then it propagates to the second mirror 17.2, where it is deviated orthogonally in the same rotation direction. It then propagates, parallel to the emission axis Z, but in a direction opposite to the latter, to the image sensor 20. The first and second positions 10.1 and 10.2 lie between the light source and the first mirror 17.1, and between the second mirror 17.2 and the image sensor 20, respectively. The mirrors 17.1 and 17.2 reflect all or some of a light wave propagating from the first position to the second position. The propagation of the light wave from the light source to the sensor then follows an optical path 14 that is not rectilinear. The optical system 15 is placed, on said optical path, between the first and second position.

Figure 6B:
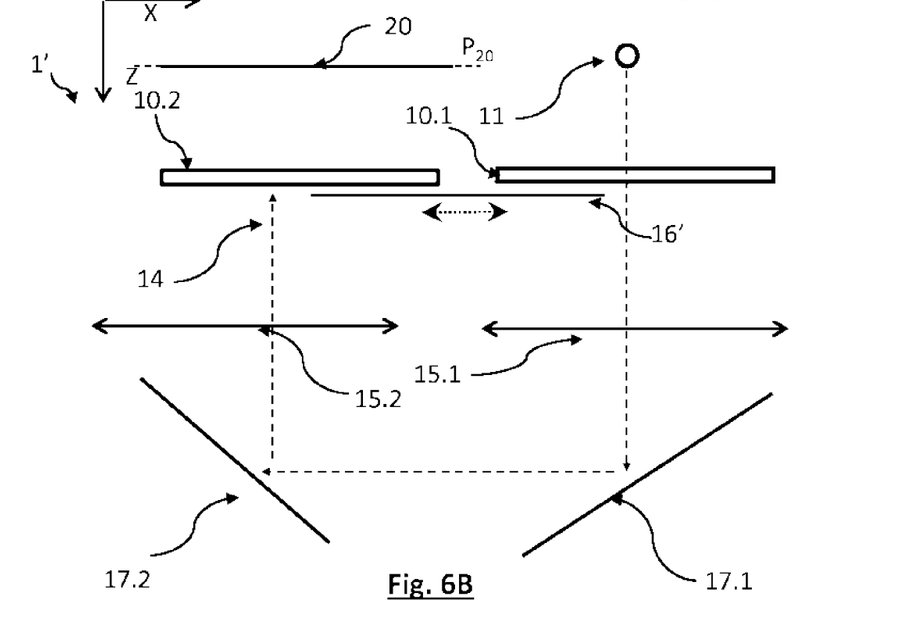

FIG. 6B is an example showing an optical system 15 including the objective 15.1, such as described above, placed between the first position 10.1 and the first mirror 17.1, whereas the tube lens 15.2 is placed between the second mirror 17.2 and the second position 10.2.

As in the examples described above, the device 1' makes it possible to observe, using two different imaging modalities, an object placed alternatively in the first or second position. It also allows an object, called the first object, placed in the first position 10.1, and an auxiliary object, called the second object, placed in the second position 10.2, to be observed simultaneously.

According to one variant, shown in FIGS. 6A and 6B, the holder 16 includes a movable portion 16' that allows the object 10 to be moved between the first position 10.1 and the second position 10.2. Preferably, the distance between the first position 10.1 and the first mirror 17.1 is equal to the distance between the second position 10.2 and the second mirror 17.2. Thus, the movement between the first position 10.1 and the second position 10.2 amounts to a simple translation in a plane orthogonal to the emission axis Z. This allows an object to be easily moved between the two positions. Thus, the holder may include a translational stage that ensures the translation of the object between the two positions 10.1 and 10.2.

Figure 6C:
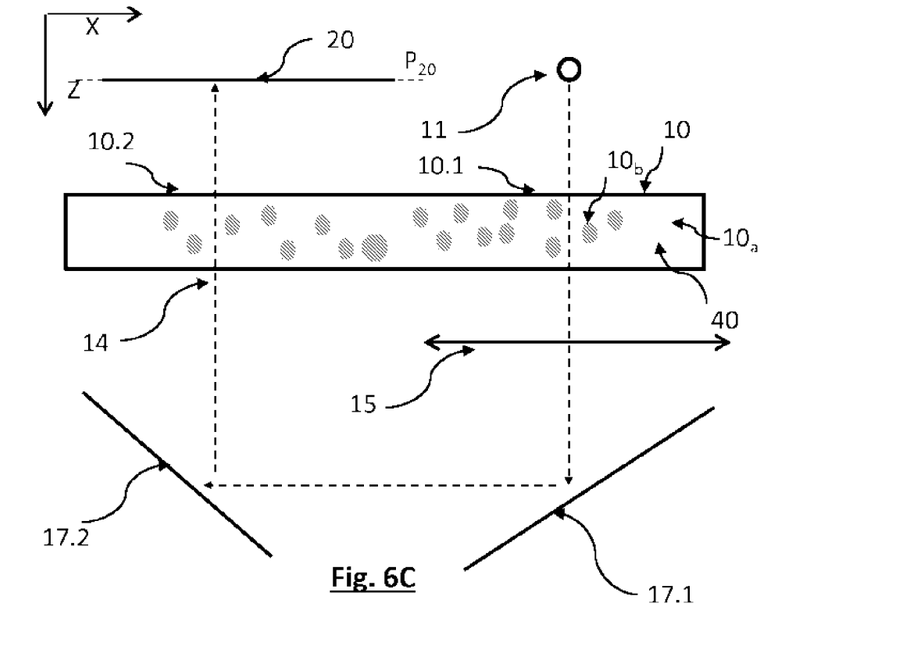
FIG. 6C shows one particular implementation of this embodiment.

FIG. 6C shows an example implementation of the invention, in which implementation a fluidic channel 40 lies transversely to the optical path 14, and occupies both the first position 10.1 and the second position 10.2. The device 1' makes it possible to observe a first portion of the channel, occupying the first position 10.1, and playing the role of first object, and a second portion of the channel, occupying the second position 10.2, and playing the role of second object. The fluidic channel 40 contains particles $10_b$ in suspension that are entrained by a fluid $10_a$. The observation of said first portion, through the optical system 15, allows particles of small size to be detected, and optionally counted, because of the high magnification provided by the optical system 15. The observation of said second portion, using the lensless imaging modality, allows particles of larger size to be detected, and optionally counted, in a larger field of observation.

The invention will possibly be implemented in the field of the observation of biological samples, or of samples taken in the field of food processing or other industrial fields.

The invention claimed is:

1. A device for observing an object, comprising:
a light source and an image sensor, the light source being configured to emit an emission wave, along an emission axis, so that a light wave propagates, along an optical path, toward the image sensor, through an object;
an optical system that is placed, on the optical path, between the light source and the image sensor;
a holder that defines a first position and a second position, each position being configured to receive the object, the holder being configured such that:
the first position is interposed, on the optical path, between the light source and the optical system, the optical system configured to conjugate the image sensor to the first position; and
the second position is interposed, on the optical path, between the optical system and the image sensor, such that there is no magnifying optics between the second position and the image sensor.

2. The device of claim 1, wherein the optical path lies parallel to the emission axis so that the light source, the optical system, and the image sensor are aligned along the emission axis, the holder configured such that the first position and the second position are aligned along the emission axis.

3. The device of claim 2, wherein the holder is translationally movable in a direction that is perpendicular to the emission axis.

4. The device of claim 1, further comprising a first mirror placed, along the optical path, between the light source and the image sensor, the first mirror lying between the first and second positions and configured to reflect a light wave propagating from the first position to the second position.

5. The device of claim 4, further comprising:
a second mirror placed between the first position and the second position,
the first and second mirrors forming an assembly, the assembly configured to reflect a light wave propagating from the first position along an axis parallel to the emission axis, the first and second positions being offset along an axis that is perpendicular to the emission axis.

6. The device of claim 5, wherein the first and second positions are aligned along an offset axis, that is perpendicular to the emission axis.

7. The device of claim 1, wherein the holder includes a moving mechanism configured to move the object between the first and second positions.

8. The device of claim 6, wherein the holder comprises a moving mechanism configured to move the object between the first and second positions, and wherein the moving mechanism is configured to translate the object between the first and second positions, along the offset axis.

9. A method for observing an object using a device as claimed in claim 1, wherein the light source emits the emission wave at a wavelength, the object being transparent or translucent at the wavelength, the method comprising:
a) positioning the object in the first position and obtaining a first image of the object using the image sensor, the object being conjugated with the image sensor by the optical system, the first image being formed using a conventional imaging modality;
and/or
b) positioning the object in the second position and obtaining a second image of the object using the image sensor, using a lensless imaging modality.

10. The method of claim 9, wherein a) and b) are carried out in succession, and wherein:
the first image defines a first field of observation of the object; and
the second image defines a second field of observation of the object;
the second field of observation being larger than the first field of observation.

11. The method of claim 10, further comprising, following b):
b') applying, to the second image, a propagation operator that takes into account a distance between the second position and the image sensor, to obtain a reconstructed image of the object placed in the second position.

12. The method of claim 9, wherein during a), a first object is positioned in the first position, the method further comprising:
placing a second object in the second position; and
obtaining, with the image sensor, a dual image, simultaneously showing the first object and the second object.

13. The method of claim 12, further comprising:
d) performing a numerical reconstruction, which comprises applying a propagation operator to the dual image, to obtain a reconstructed dual image:

in a plane extending through the first position, the reconstructed dual image corresponding to an image of the first object;

and/or in a plane extending through the second position the reconstructed dual image corresponding to an image of the second object.

14. The method of claim 13, further comprising:

selecting, depending on their respective intensity, representative pixels in the reconstructed dual image, to form an image of the first object or the second object from the pixels selected.

15. The method of claim 14, wherein, in e), wherein the reconstructed dual image comprises pixels, the selection of representative pixels including:

i) calculating, for each pixel of the reconstructed dual image, an indicator representing a dispersion of the intensity of adjacent pixels around the pixel;

ii) comparing the indicator calculated for each pixel to a threshold; and iii) selecting the representative pixels on the basis of the comparison made in ii).

16. The method of claim 9, wherein the object occupies both the first position and the second position, the method further comprising:

obtaining a first image defining a first field of observation of the object; and obtaining a second image defining a second field of observation of the object;

the second field of observation being larger than the first field of observation.

17. A method for observing a first object and a second object, comprising:

placing a light source and an image sensor such that the light source emits an emission light wave at a wavelength, the emission light wave propagating toward the image sensor, thereby defining an optical path;

interposing a first object and a second object between the light source and the image sensor, the first and second objects being transparent or translucent at the wavelength, the first and second objects lying transversely to the optical path, such that the first and second objects are placed, on the optical path, on either side of an optical system, the optical system configured to conjugate a portion of the first object with the image sensor; and obtaining a dual image, on the image sensor, from the emission wave that propagates, from the light source, through the first and second objects, to the image sensor.

18. The method of claim 17, further comprising applying a numerical propagation operator to the dual image, to obtain a reconstructed dual image at a reconstruction distance from the sensor.

19. The method of claim 18, wherein the reconstructed dual image is representative of the second object, the reconstruction distance being a distance between the second object and the image sensor;

and/or the reconstructed dual image is representative of the first object, the reconstruction distance being a distance between the first object and the image sensor.

* * * * *